United States Patent
Ota et al.

(10) Patent No.: US 9,415,290 B2
(45) Date of Patent: Aug. 16, 2016

(54) GOLF SWING ANALYZING APPARATUS AND METHOD OF ANALYZING GOLF SWING

(71) Applicants: Seiko Epson Corporation, Tokyo (JP); Keio University, Tokyo (JP)

(72) Inventors: Ken Ota, Fuchu (JP); Kazuhiro Shibuya, Shiojiri (JP)

(73) Assignees: Seiko Epson Corporation (JP); Keio University (JP)

( * ) Notice: Subject to any disclaimer, the term of this patent is extended or adjusted under 35 U.S.C. 154(b) by 290 days.

(21) Appl. No.: 14/043,302

(22) Filed: Oct. 1, 2013

(65) Prior Publication Data

US 2014/0100048 A1    Apr. 10, 2014

(30) Foreign Application Priority Data

Oct. 5, 2012 (JP) ................. 2012-223326

(51) Int. Cl.
  *A63B 60/42*  (2015.01)
  *A63B 69/36*  (2006.01)
  *G09B 19/00*  (2006.01)

(52) U.S. Cl.
  CPC ........ *A63B 69/3632* (2013.01); *G09B 19/0038* (2013.01)

(58) Field of Classification Search
  CPC ................ A63B 53/00; A63B 2069/3602
  USPC ......................... 473/222, 223, 226
  See application file for complete search history.

(56) References Cited

U.S. PATENT DOCUMENTS

| | | |
|---|---|---|
| 8,109,816 B1 | 2/2012 | Grober |
| 2002/0107085 A1 | 8/2002 | Lee et al. |
| 2009/0017930 A1* | 1/2009 | Burnett ............. A63B 24/0003 473/227 |
| 2009/0247312 A1 | 10/2009 | Sato et al. |
| 2010/0210371 A1 | 8/2010 | Sato et al. |

(Continued)

FOREIGN PATENT DOCUMENTS

| | | |
|---|---|---|
| JP | 11-169499 | 6/1999 |
| JP | 2004-024488 A | 1/2004 |
| JP | 2008-073210 A | 4/2008 |
| JP | 2009-125507 A | 6/2009 |
| JP | 2009-240677 A | 10/2009 |
| JP | 2010-011926 A | 1/2010 |

OTHER PUBLICATIONS

Robert D. Grober, "An Accelerometer Based Instrumentation of the Golf Club; Comparative Analysis of Golf Swings", Department of Applied Physics, Yale University, New Haven, CT, Dec. 30, 2009, pp. 1-23.

*Primary Examiner* — Allen Chan
(74) *Attorney, Agent, or Firm* — Harness, Dickey & Pierce, P.L.C.

(57) ABSTRACT

An aspect of the invention relates to a golf swing analyzing apparatus, comprising: a first arithmetic section operating to use an output from a first inertial sensor and an output from a second inertial sensor to calculate a first energy amount, the first inertial sensor being attached to a portion of an upper body of a golfer, the second inertial sensor being attached to a golf club, the first energy amount being generated in the upper body of the golfer; a second arithmetic section operating to use the output from the first inertial sensor and the output from the second inertial sensor to calculate a second energy amount transferred to the golf club from the upper body of the golfer; and a processing section calculating an energy transferring ratio of an energy transferred from the upper body of the golfer to the golf club based on a ratio of the second energy amount to the first energy amount.

11 Claims, 8 Drawing Sheets

(56) References Cited

U.S. PATENT DOCUMENTS

| | | |
|---|---|---|
| 2010/0323805 A1 | 12/2010 | Kamino et al. |
| 2012/0128203 A1* | 5/2012 | Nakaoka ............... A63B 69/36 382/103 |
| 2012/0157241 A1 | 6/2012 | Nomura et al. |
| 2012/0179418 A1 | 7/2012 | Takasugi et al. |
| 2013/0005496 A1 | 1/2013 | Priester et al. |

* cited by examiner

GOLF SWING ANALYZING APPARATUS AND METHOD OF ANALYZING GOLF SWING

This application is based upon and claims the benefit of priority from the prior Japanese Patent Application No. 2012-223326 filed on Oct. 5, 2012, the entire contents of which are incorporated herein by reference.

BACKGROUND

The present invention relates to a golf swing analyzing apparatus and a method of analyzing golf swings.

A golf swing analyzing apparatus is generally known as disclosed in Japanese Patent Application Publication No. 2010-11926, for example. The golf swing analyzing apparatus utilizes an optical motion capture system for capturing an image of a swing of a golfer. Markers are fixed to specific positions of the golfer and/or a golf club for the capture of the image of the swing. The movement of the markers is recorded as an image for determining the moving paths of the specific positions. In addition, a golf swing analyzing apparatus utilizing an acceleration sensor is also generally known as disclosed in Japanese Patent Application Publication No. 11-169499, for example. An acceleration sensor is attached to the golf club. The form of the golf swing is analyzed based on the acceleration measured by the acceleration sensor.

The golf swing analyzing apparatus utilizing an optical motion capture system as disclosed in Japanese Patent Application Publication No. 2010-11926 requires tremendously large equipment so that it is hard to realize the measurement in the field. A golf swing analysis utilizing an inertial sensor such as an acceleration sensor is recently proposed as disclosed in Japanese Patent Application Publication No. 11-169499.

However, one does not become aware of how much amount of energy is generated in the upper body of a golfer during a golf swing, or how much amount of energy is transferred to the golf club from the upper body of a golfer, in a golf swing analysis utilizing an acceleration sensor.

SUMMARY

An aspect of the invention relates to a golf swing analyzing apparatus, comprising: a first arithmetic section operating to use the output from a first inertial sensor and the output from a second inertial sensor to calculate a first energy amount, the first inertial sensor being attached to a portion of the upper body of a golfer, the second inertial sensor being attached to the golf club, the first energy amount being generated at the upper body of the golfer; a second arithmetic section operating to use the output from the first inertial sensor and the output from the second inertial sensor to calculate a second energy amount transferred to the golf club from the upper body of the golfer; and a processing section calculating an energy transferring ratio of an energy transferred from the upper body of the golfer to the golf club based on the ratio of the second energy amount to the first energy amount.

Another aspect of the invention relates to a method of analyzing golf swings, comprising: calculating a first energy amount generated in the upper body of a golfer, using the output from a first inertial sensor and the output from a second inertial sensor to calculate a first energy amount, the first inertial sensor being attached to a portion of the upper body of the golfer, the second inertial sensor being attached to the golf club; calculating a second energy amount transferred to the golf club from the upper body of the golfer, using the output from the first inertial sensor and the output from the second inertial sensor; and calculating an energy transferring ratio of the energy transferred from the upper body of the golfer to the golf club based on the ratio of the second energy amount to the first energy amount.

DESCRIPTION OF EXEMPLARY EMBODIMENTS

Figure 1:
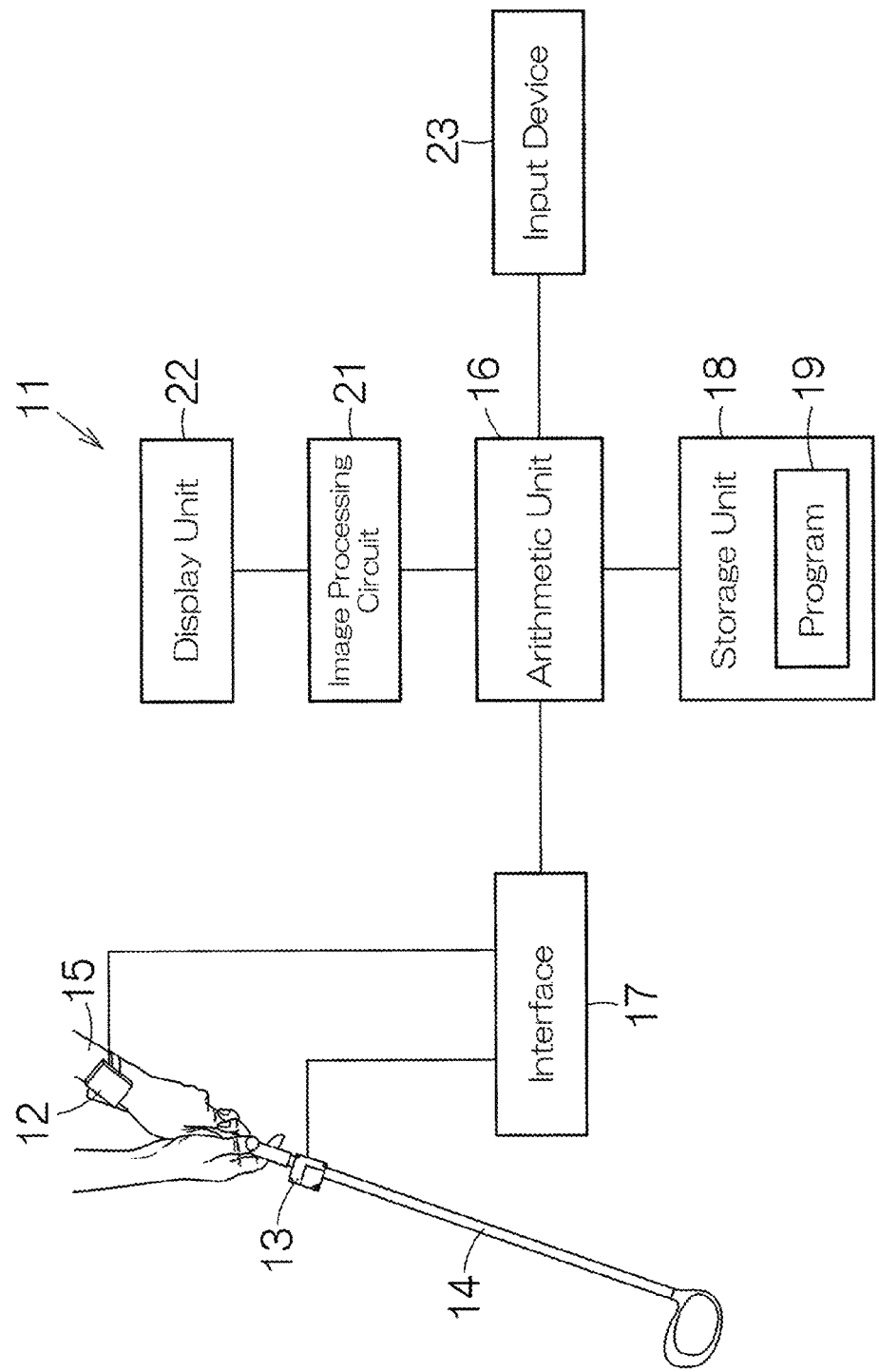
FIG. 1 is a schematic view illustrating the structure of a golf swing analyzing apparatus according to one exemplary embodiment of the invention.

According to at least one aspect of the invention, a golf swing analyzing apparatus and a method of analyzing golf swings are provided to analyze the energy transferring ratio of the energy transferred to the golf club from the upper body of a golfer in the analysis of a golf swing, thereby realizing the analysis of a golf swing with a higher accuracy based on the analyzed energy transferring ratio.

(a) An aspect of the invention relates to a golf swing analyzing apparatus, comprising: a first arithmetic section operating to use the output from a first inertial sensor and the output from a second inertial sensor to calculate a first energy amount, the first inertial sensor being attached to a portion of the upper body of a golfer, the second inertial sensor being attached to the golf club, the first energy amount being generated in the upper body of the golfer; a second arithmetic section operating to use the output from the first inertial sensor and the output from the second inertial sensor to calculate a second energy amount transferred to the golf club from the upper body of the golfer; and a processing section calculating the energy transferring ratio of the energy transferred from the upper body of the golfer to the golf club based on the ratio of the second energy amount to the first energy amount.

One is allowed to become aware of how much amount of energy is generated in the upper body of a golfer during a golf swing, or how much amount of energy is transferred to the golf club from the upper body of a golfer. The observation of the energy reveals the timing of the action during the golf swing, thereby enabling an efficient transfer of the energy to the golf club. It is possible to provide indices for the timing of the action during the golf swing. For example, the repetition of the change of timing and the observation enables a superior improvement to the timing of the action during the golf swing through try and error. Here, the timing of the action during a golf swing includes rhythm and tempo of a golf swing, as well as the timing of events during a golf swing, such as the time point of relaxing, the time point of reversal of a turn, and the like.

(b) The apparatus may operate to utilize a three-dimensional double pendulum model to calculate the first energy amount and the second energy amount, the portion of the upper body of the golfer forming a first link of the three-dimensional double pendulum model, the golf club forming a second link of the three-dimensional double pendulum model. A golf swing is in this manner fitted into a model. The three-dimensional double pendulum model kinetically represents the movement of a golf swing with a relatively high accuracy. The golf swing is in this manner effectively analyzed.

(c) The fulcrum of the first link can be located at the center of a line connecting the shoulders of the golfer, and the joint between the first link and the second link can be located on the grip of the golf club. A golf swing is thus analyzed with a higher accuracy.

(d) Each of the first inertial sensor and the second inertial sensor may include an acceleration sensor and a gyro sensor. The acceleration sensor and the gyro sensor enable a precise detection of the acceleration and the angular velocity in calculation of the first energy amount and the second energy amount.

(e) The first arithmetic section may operate to use the acceleration and the angular velocity detected at the first inertial sensor, the mass of the portion of the upper body of the golfer, the acceleration and the angular velocity detected at the second inertial sensor, and the mass of the golf club, to calculate the energy change rate of the first energy amount generated at the upper body of the golfer. The first arithmetic section is allowed to calculate the first energy amount based on the integration of the calculated energy change rate.

(f) The second arithmetic section may operate to use the acceleration and the angular velocity detected at the first inertial sensor, the acceleration detected at the second inertial sensor, and the mass of the golf club to calculate the energy change rate of the second energy amount transferred from the upper body of the golfer to the golf club. The second arithmetic section is allowed to calculate the second energy amount based on the integration of the calculated energy change rate.

(g) The golf swing analyzing apparatus may include an energy change rate inversion detecting section configured to detect the inversion of the positive/negative signs of the total energy change rate for the portion of the upper body of the golfer. The observation of the inversion of the total energy change rate reveals the timing of the action during the golf swing, which enables an efficient transfer of the energy to the golf club. It is possible to provide indices for the timing of the action during the golf swing. For example, the repetition of the change of timing and the observation enables a superior improvement to the timing of the action during the golf swing through try and error.

(h) The golf swing analyzing apparatus may include an image data generating section generating a first image data for displaying the energy change rate of the first energy amount generated at the upper body of the golfer and a second image data for displaying the energy change rate of the second energy amount transferred to the golf club from the upper body of the golfer. The observation of the energy change rates reveals the timing of the action during a golf swing, which enables an efficient transfer of the energy to the golf club. In addition, if a relative relationship is observed between the energy change rate of the first energy amount and the energy change rate of the second energy amount, it is possible to reveal the timing of the action during the golf swing, which enables an efficient transfer of the energy to the golf club. Indices are provided to identify the timing of the action during a golf swing. For example, the repetition of the change of timing and the observation enables a superior improvement to the timing of the action during a golf swing through try and error.

(i) The golf swing analyzing apparatus may include an image data generating section generating a third image data for displaying the energy transferring ratio.

(j) The golf swing analyzing apparatus may include an image data generating section generating a fourth image data for displaying the total energy change rate for the portion of the upper body of the golfer.

(k) The golf swing analyzing apparatus may include an image data generating section operating to use the output from at least one of the first inertial sensor and the second inertial sensor to generate a path data of a golf swing, the image data generating section generating an image data for relating the information on the timing of the inversion to the path data.

(l) Another aspect of the invention relates to a method of analyzing golf swings, comprising: calculating a first energy amount generated at the upper body of a golfer, using the output from a first inertial sensor and the output from a second inertial sensor to calculate a first energy amount, the first inertial sensor being attached to a portion of the upper body of the golfer, the second inertial sensor being attached to the golf club; calculating a second energy amount transferred to the golf club from the upper body of the golfer, using the output from the first inertial sensor and the output from the second inertial sensor; and calculating the energy transferring ratio of the energy transferred from the upper body of the golfer to the golf club based on the ratio of the second energy amount to the first energy amount.

One is allowed to become aware of how much amount of energy is generated in the upper body of a golfer during a golf swing, or how much amount of energy is transferred to the golf club from the upper body of a golfer. The observation of the energy reveals the timing of the action during a golf swing, thereby enabling an efficient transfer of the energy to the golf club. It is possible to provide indices for the timing of the action during the golf swing. For example, the repetition of the change of timing and the observation enables a superior improvement to the timing of the action during a golf swing through try and error. Here, the timing of the action during a golf swing includes rhythm and tempo of a golf swing, as well as the timing of events during a golf swing, such as the time point of relaxing, the time point of reversal of a turn, and the like.

(m) Another aspect of the invention relates to a method of displaying an analysis on a golf swing, comprising displaying an energy transferring ratio of an energy transferred from an upper body of a golfer to a golf club based on a ratio of a second energy amount to a first energy amount, wherein the first energy amount is generated at the upper body of the golfer, and the second energy amount is transferred to the golf club from the upper body of the golfer.

(n) Another aspect of the invention relates to a method of displaying an analysis on a golf swing, comprising displaying at least one of a total amount of a first energy amount for a golf swing and a total amount of a second energy amount, wherein the first energy amount is generated at an upper body of a golfer, and the second energy amount is transferred to a golf club from the upper body of the golfer.

(o) Another aspect of the invention relates to a method of displaying an analysis on a golf swing, comprising displaying an image relating information on a timing of an inversion to a path data of a golf swing, wherein the inversion being of positive/negative signs of a total energy change rate for a portion of an upper body of a golfer.

A detailed description will be made below on an exemplary embodiment of the invention referring to the attached drawings. It is to be understood that both the foregoing general description and the following detailed description are exemplary and explanatory and are not restrictive of the invention as claimed, and all elements of the exemplary embodiment may not be indispensable to a solution of the invention.

(1) Structure of Golf Swing Analyzing Apparatus

FIG. 1 schematically illustrates the structure of a golf swing analyzing apparatus 11 according to one embodiment of the invention. The golf swing analyzing apparatus 11 includes a first inertial sensor 12 and a second inertial sensor 13, for example. The first and second inertial sensors 12, 13 individually include an acceleration sensor and a gyro sensor assembled therein. The acceleration sensor is configured to detect the acceleration in the directions of three axes of an orthogonal coordinate system. The gyro sensor is configured to detect the angular velocity around each of three axes of an orthogonal coordinate system. The first and second inertial sensors 12, 13 output detection signals. The detection signals specify the magnitude of the acceleration and the angular velocity for the individual axes of an orthogonal coordinate system. The acceleration sensors and the gyro sensors are expected to detect the acceleration and the angular velocity with a relatively high accuracy. The first inertial sensor 12 is attached to an arm 15 or a hand, for example, to the left arm for the right-handed golfer. Here, although the first inertial sensor 12 is attached to a forearm of a golfer, the first inertial sensor 12 may be attached to a brachium of a golfer. The second inertial sensor 13 is attached to a golf club 14. Preferably, the second inertial sensor 13 is attached to the grip or shaft of the golf club 14. The first and second sensors 12, 13 may respectively be fixed to the arm 15 and the golf club 14 in an immobilized manner. Here, a detection axis of the second inertial sensor 13 is set in parallel with the longitudinal axis of the golf club 14. It should be noted that the first inertial sensor 12 may be mounted to the upper body of a golfer, especially to the shoulders, although the first inertial sensor 12 is attached to the arm 15 in this embodiment.

The golf swing analyzing apparatus 11 includes an arithmetic unit 16. The first and second inertial sensors 12, 13 are connected to the arithmetic unit 16. An interface circuit 17 is connected to the arithmetic unit 16 for the connection of the first and second inertial sensors 12, 13. The interface circuit 17 may be connected to the first and second inertial sensors 12, 13 with or without wires. The arithmetic unit 16 receives the detection signals from the first and second inertial sensors 12, 13.

A storage unit 18 is connected to the arithmetic unit 16. For example, a golf swing analyzing software program 19 and related data are stored in the storage unit 18. The arithmetic unit 16 executes the golf swing analyzing software program 19 to realize a method of analyzing a golf swing. The storage unit 18 may include a dynamic random access memory (DRAM), a large capacity storage unit, a non-volatile memory, and the like. For example, the DRAM temporarily holds the golf swing analyzing software program 19 for the realization of the method of analyzing a golf swing. The golf swing analyzing software program and data are stored in the large capacity storage unit such as a hard disk drive unit (HDD). A relatively small program such as a basic input/output system (BIOS) and relatively small data may be stored in the non-volatile memory.

An image processing circuit 21 is connected to the arithmetic unit 16. The arithmetic unit 16 supplies image data to the image processing circuit 21. A display unit 22 is connected to the image processing circuit 21. An interface circuit, not depicted, is connected to the image processing circuit 21 for the connection of the display unit 22. The image processing circuit 21 supplies imaging signals to the display unit 22 in accordance with the supplied image data. The imaging signals determine images displayed on the screen of the display unit 22. A liquid crystal display or any other type of a flat panel display may be utilized as the display unit 22. Here, the arithmetic unit 16, the storage unit 18 and the image processing circuit 21 are provided in the form of a computer apparatus, for example.

An input device 23 is connected to the arithmetic unit 16. The input device 23 at least includes alphabetical keypads and numeric keypads. The input device 23 is utilized to input alphabetical information and numeric information to the arithmetic unit 16. The input device 23 may be a keyboard, for example.

(2) Three-Dimensional Double Pendulum Model

Figure 2:
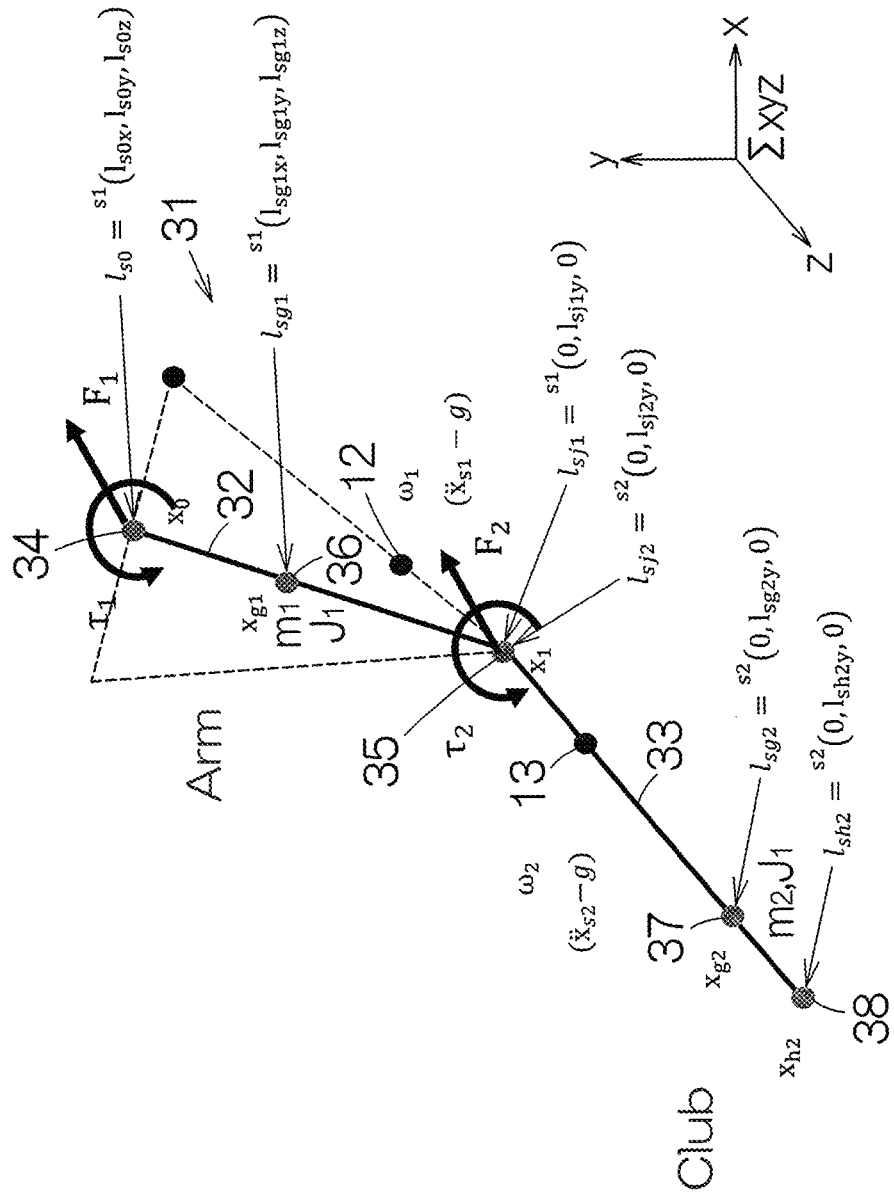
FIG. 2 is a schematic view illustrating the relationship between a three-dimensional double pendulum model and a golfer grasping a golf club.

The arithmetic unit 16 defines an imaginary space. The imaginary space is formed as a three-dimensional space. As depicted in FIG. 2, the three-dimensional space has an absolute reference coordinate system $\Sigma xyz$. A three-dimensional double pendulum model 31 is constructed in the three-dimensional space in accordance with the absolute reference coordinate system $\Sigma xyz$. The three-dimensional double pendulum model 31 includes a first link 32 and a second link 33. The end of the first link 32 is coupled to a fulcrum 34 (coordinate $x_0$). The first link 32 thus acts as a spherical pendulum around the fulcrum 34. The fulcrum 34 may move. The end of the second link 33 is coupled to the other end of the first link 32 at a joint 35 (coordinate $x_1$) functioning as a ball joint. The second link 33 thus acts as a spherical pendulum around the joint 34 relative to the first link 32. It is required to identify the mass $m_1$, $m_2$ of the first and second links 32, 33, the inertia tensor $J_1$ of the first link 32 around the fulcrum 34, the inertia tensor $J_2$ of the second link 33 around the joint 35 in the three-dimensional double pendulum model. Here, the absolute reference coordinate system $\Sigma xyz$ serves to locate the centroid 36 of the first link 32 at the coordinate $x_{g1}$, the centroid 37 of the second link 33 at the coordinate $x_{g2}$, and the club head 38 at the coordinate $x_{h2}$.

The three-dimensional double pendulum model 31 corresponds to a representation of a golfer and the golf club 14. The fulcrum 34 of the first link 32 corresponds to the central position between the shoulders in the upper body of the golfer. The joint 35 represents the grip. The second link 33 represents the golf club 14. The first inertial sensor 12 is fixed to the arm 15 of the golfer. The central position between the shoulders can be fixed relative to the first inertial sensor 12. The absolute reference coordinate system $\Sigma xyz$ serves to locate the first inertial sensor 12 at the coordinate $x_{s1}$. The second inertial sensor 13 is fixed to the second link 33. The absolute reference coordinate system $\Sigma xyz$ serves to locate the second inertial sensor 13 at the coordinate $x_{s2}$. The first inertial sensor 12 and the second inertial sensor 13 individually output acceleration signals and angular velocity signals. The acceleration signals from the first inertial sensor 12 and the second inertial sensor 13 respectively specify the acceleration including the effect of the gravity g as follows:

$$(\ddot{x}_{s1}-g),(\ddot{x}_{s2}-g) \quad \text{[Mathematical Expression 1]}$$

The angular velocity signals from the first inertial sensor 12 and the second inertial sensor 13 respectively specify the angular velocity $\omega_1$, $\omega_2$.

The arithmetic unit 16 fixes a local coordinate system $\Sigma_{s1}$ to the first inertial sensor 12. The local coordinate system $\Sigma_{s1}$ has the origin coincident with the origin of the detection axes of the first inertial sensor 12. The local coordinate system $\Sigma_{s1}$ locates the joint 35 on the y-axis. Accordingly, the position $l_{sj1}$ of the joint 35 is identified as the coordinate $(0, l_{sj1y}, 0)$ in the local coordinate system $\Sigma_{s1}$. Likewise, the position $l_{s0}$ of the fulcrum 34 and the position $l_{sg1}$ of the centroid 36 are identified as the coordinate $(l_{s0x}, l_{s0y}, l_{s0z})$ and the coordinate $(l_{sg1x}, l_{sg1y}, l_{sg1z})$ in the local coordinate system $\Sigma_{s1}$.

The arithmetic unit 16 likewise fixes a local coordinate system $\Sigma_{s2}$ to the second inertial sensor 13. The local coordinate system $\Sigma_{s2}$ has the origin coincident with the origin of the detection axes of the second inertial sensor 13. The longitudinal axis of the golf club 14 coincides with the y-axis of the local coordinate system $\Sigma_{s2}$. Accordingly, the position $l_{sj2}$ of the joint 35 is identified as the coordinate $(0, l_{sj2y}, 0)$ in the local coordinate system $\Sigma_{s2}$. Likewise, the position $l_{sg2}$ of the centroid 37 and the position $l_{sh2}$ of the club head 38 are identified as the coordinate $(0, l_{sg2y}, 0)$ and the coordinate $(0, l_{sh2y}, 0)$ in the local coordinate system $\Sigma_{s2}$.

(3) Structure of Arithmetic Unit

Figure 3:
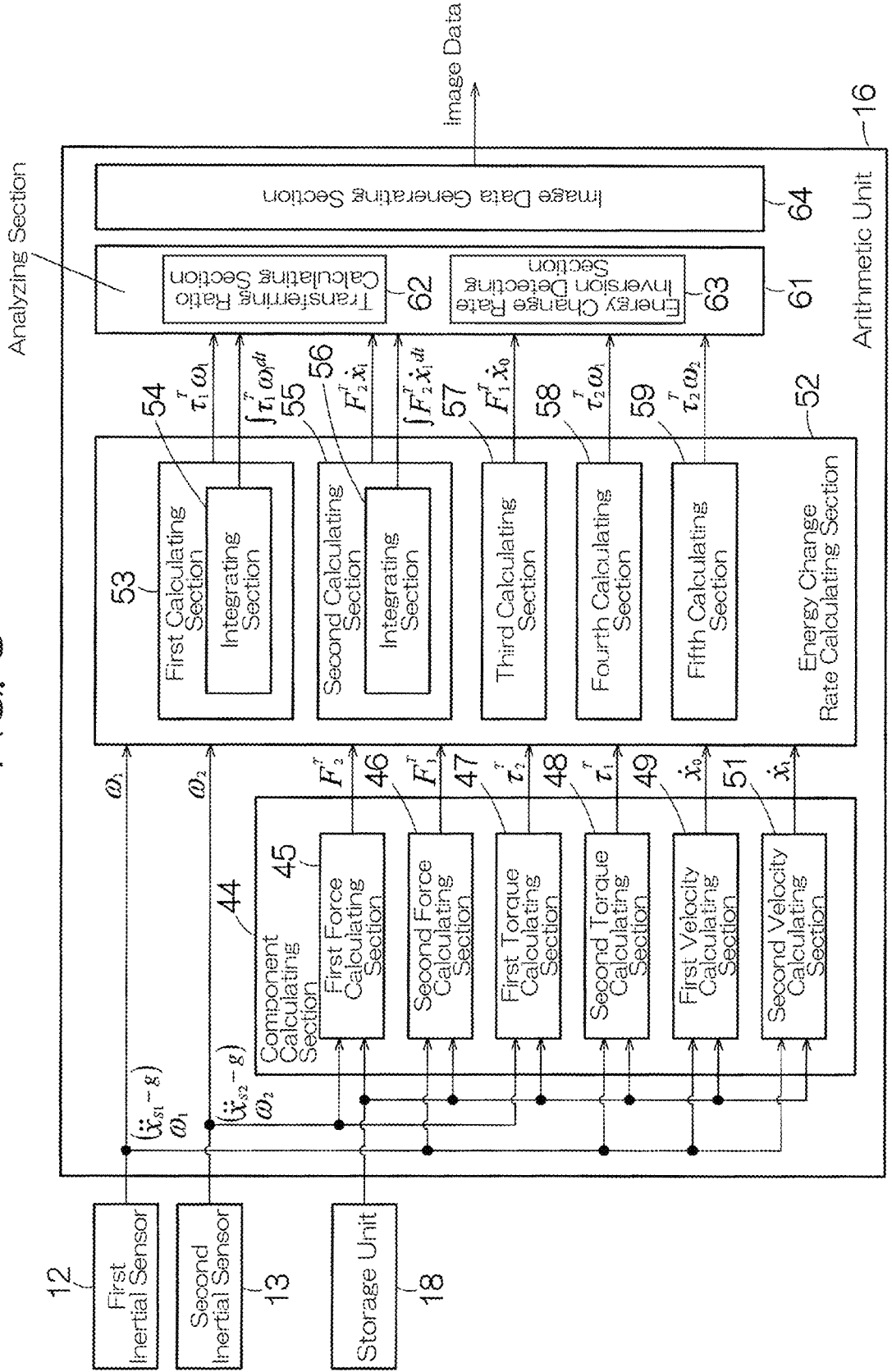
FIG. 3 is a block diagram schematically illustrating the structure of an arithmetic unit.

FIG. 3 schematically illustrates the structure of the arithmetic unit 16. The arithmetic unit 16 includes a component calculating section 44. The acceleration signals and the angular velocity signals are input to the component calculating section 44 from the first inertial sensor 12 and the second inertial sensor 13. The component calculating section 44 calculates, based on the supplied acceleration signals and the supplied angular velocity signals, componential values required in the calculation of the energy change rate. The component calculating section 44 obtains various values from the storage unit 18 for the calculation of the energy change value.

The component calculating section 44 includes a first force calculating section 45. The first force calculating section 45 calculates the first inter-joint force $F_2$ acting on the second link 33. The first force calculating section 45 obtains the acceleration signals from the second inertial sensor 13 and a first mass data of the golf club 14 for the calculation of the first inter-joint force $F_2$. The first mass data specifies the mass $m_2$ of the golf club 14. The first mass data may previously be stored in the storage unit 18. The first inter-joint force $F_2$ is calculated in accordance with the following mathematical expression:

$$F_2 = m_2(\ddot{x}_{g2}-g) \quad \text{[Mathematical Expression 2]}$$

In this case, the following component represents the acceleration of the centroid 37 of the second link 33:

$$(\ddot{x}_{g2}-g) \quad \text{[Mathematical Expression 3]}$$

The acceleration of the centroid 37 is determined based on the measurement of the second inertial sensor 13. The first force calculating section 45 outputs first inter-joint force signals specifying the value of the first inter-joint force $F_2$.

The component calculating section 44 includes a second force calculating section 46. The second force calculating section 46 calculates the second inter-joint force $F_1$ acting on the first link 32. The second force calculating section 46 obtains the acceleration signals from the first inertial sensor 12, a second mass data and the first inter-joint force signals for the calculation of the second inter-joint force $F_1$. The second mass data specifies the mass $m_1$ of the arm 15. The second mass data may previously be stored in the storage unit 18. The second inter-joint force $F_1$ is calculated in accordance with the following mathematical expression:

$$F_1 = m_1(\ddot{x}_{g1}-g) + F_2 \quad \text{[Mathematical Expression 4]}$$

In this case, the following component represents the acceleration of the centroid 36 of the first link 32:

$$(\ddot{x}_{g1}-g) \quad \text{[Mathematical Expression 5]}$$

The acceleration of the centroid 36 is determined based on the measurement of the first inertial sensor 12. The second force calculating section 46 outputs second inter-joint force signals specifying the value of the second inter-joint force $F_1$.

The component calculating section 44 includes a first torque calculating section 47. The first torque calculating section 47 calculates torque $\tau_2$ acting on the second link 33 around the joint 35. The first torque calculating section 47 obtains the angular velocity signals from the second inertial sensor 13, a first inertia tensor data, a first position data, a second position data and the first inter-joint force signals for the calculation of the torque $\tau_2$. The first inertia tensor data specifies the inertia tensor $J_2$ of the golf club 14. The first position data specifies the position $l_{sj2}$ of the joint 35 in the local coordinate system $\Sigma_{s2}$. The second position data specifies the position $l_{sg2}$ of the centroid 37 in the local coordinate system $\Sigma_{s2}$. The first inertia tensor data, the first position data and the second position data may previously be stored in the storage unit 18. The first inter-joint force signals may be supplied from the first force calculating section 45. The torque $\tau_2$ is calculated in accordance with the following mathematical expression:

$$\tau_2 = J_2\dot{\omega}_2 + \omega_2 \times J_2\omega_2 + \|l_{sg2}-l_{sj2}\|e_{l2} \times F_2 \quad \text{[Mathematical Expression 6]}$$

Here, the unit vector $e_{l2}$ determines the longitudinal direction from the grip end to the club head of the golf club 14. The first torque calculating section 47 outputs a first torque signal specifying the value of the torque $\tau_2$.

The component calculating section 44 includes a second torque calculating section 48. The second torque calculating section 48 calculates torque $\tau_1$ acting on the first link 32 around the fulcrum 34. The second torque calculating section 48 obtains the angular velocity signals from the first inertial sensor 12, a second inertia tensor data, a third position data, a fourth position data, a fifth position data, the first inter-joint force signals, the second inter-joint force signals and the first torque signal for the calculation of the torque $\tau_1$. The second inertia tensor data specifies the inertia tensor $J_1$ of the arm 15. The third position data specifies the position $l_{s0}$ of the fulcrum 34 in the local coordinate system $\Sigma_{s1}$. The fourth position data specifies the position $l_{sj1}$ of the joint 35 in the local coordinate system $\Sigma_{s1}$. The fifth position data specifies the position $l_{sg1}$ of the centroid 36 in the local coordinate system $\Sigma_{s1}$. The second inertia tensor data and the third to fifth position data may previously be stored in the storage unit 18. The first inter-joint force signals may be supplied from the first force calculating section 45. The second inter-joint force signals may be supplied from the second force calculating section 46. The torque $\tau_1$ is calculated in accordance with the following mathematical expression:

$$\tau_1 = J_1\dot{\omega}_1 + \omega_1 \times J_1\omega_1 + \|l_{sg1}-l_{s0}\|e_{l1} \times F_1 + \|l_{sj1}-l_{sg1}\|e_{l1} \times (-F_2) + \tau_2 \quad \text{[Mathematical Expression 7]}$$

Here, the unit vector $e_{l1}$ determines the longitudinal direction of the first link 32. The second torque calculating section 48 outputs a second torque signal specifying the value of the torque $\tau_1$.

The component calculating section 44 includes a first velocity calculating section 49. The first velocity calculating section 49 calculates the velocity of the movement of the fulcrum 34. The first velocity calculating section 49 obtains the acceleration signals and the angular velocity signals from the first inertial sensor 12 and the third position data for the calculation of the velocity. The first velocity calculating section 49 operates to calculate the acceleration of the fulcrum 34 in accordance with the following mathematical expression:

$$\ddot{x}_0 = \ddot{x}_{s1} + \dot{\omega}_1 \times l_{s0} + \omega_1 \times (\omega_1 \times l_{s0}) \quad \text{[Mathematical Expression 8]}$$

The calculated acceleration is subjected to integration in accordance with the following mathematical expression:

$$\dot{x}_0 = \int \ddot{x}_0 dt \quad \text{[Mathematical Expression 9]}$$

This calculation results in the velocity of the movement of the fulcrum 34 (coordinate $x_0$). It should be understood that the initial velocity equals zero in this case. The first velocity calculating section 49 outputs a first velocity signal specifying the velocity of the movement of the fulcrum 34.

The component calculating section 44 includes a second velocity calculating section 51. The second velocity calculating section 51 calculates the velocity of the movement of the joint 35. The second velocity calculating section 51 obtains the acceleration signals and the angular velocity signals from the first inertial sensor 12 and the fourth position data for the calculation of the velocity. The second velocity calculating section 51 operates to calculate the acceleration of the joint 35 in accordance with the following mathematical expression:

$$\ddot{x}_1 = \ddot{x}_{s1} + \dot{\omega}_1 \times l_{sj0} + \omega_1 \times (\omega_1 \times l_{sj0}) \quad \text{[Mathematical Expression 10]}$$

The calculated acceleration is subjected to integration in accordance with the following mathematical expression:

$$\dot{x}_1 = \int \ddot{x}_1 dt \quad \text{[Mathematical Expression 11]}$$

This calculation results in the velocity of the movement of the joint 35 (coordinate $x_1$). It should be understood that the initial velocity equals zero in this case. The second velocity calculating section 51 outputs a second velocity signal specifying the velocity of the movement of the joint 35.

The arithmetic unit 16 includes an energy change rate calculating section 52. The angular velocity signals are input to the energy change rate calculating section 52 from the first inertial sensor 12 and the second inertial sensor 13. The first and second inter-joint force signals, the first and second torque signals and the first and second velocity signals are likewise input to the energy change rate calculating section 52 from the component calculating section 44. The energy change rate calculating section 52 calculates some energy change rates based on the input signals.

The energy change rate calculating section 52 includes a first calculating section 53. The first calculating section 53 calculates the energy change rate of the first energy amount generated at the arm 15 of the golfer. The first calculating section 53 obtains the second torque signals from the component calculating section 44 and the angular velocity signals from the first inertial sensor 12. The energy change rate of the first energy amount is calculated based on the torque $\tau_1$ and the angular velocity $\omega_1$ in accordance with the following mathematical expression:

$$\tau_1^T \omega_1 \quad \text{[Mathematical Expression 12]}$$

The first energy corresponds to the inflow energy flowing into the arm 15 resulting from the swing of the golfer. The first calculating section 53 outputs a first energy change rate signal specifying the energy change rate of the first energy amount.

The first calculating section 53 includes an integrating section 54. The integrating section 54 calculates the first energy amount based on the integration of the energy change rate. The integrating section 54 outputs a first energy amount signal specifying the first energy amount.

The energy change rate calculating section 52 includes a second calculating section 55. The second calculating section 55 calculates the energy change rate of the second energy amount transferred to the golf club 14 from the arm 15 of the golfer. The second calculating section 55 obtains the first inter-joint force signals and the second velocity signals from the component calculating section 44. The energy change rate of the second energy amount is calculated based on the first inter-joint force $F_2$ and the velocity of the joint 35 in accordance with the following mathematical expression:

$$F_2^T \dot{x}_1 \quad \text{[Mathematical Expression 13]}$$

The second calculating section 55 outputs a second energy change rate signal specifying the energy change rate of the second energy amount.

The second calculating section 55 includes an integrating section 56. The integrating section 56 calculates the second energy amount based on the integration of the energy change rate. The integrating section 56 outputs a second energy amount signal specifying the second energy amount.

The energy change rate calculating section 52 includes a third calculating section 57. The third calculating section 57 calculates the energy change rate of the third energy amount resulting from the second inter-joint force $F_1$ of the first link 32, namely of the arm 15 of the golfer. The third calculating section 57 obtains the second inter-joint force signals and the first velocity signal from the component calculating section 44. The energy change rate of the third energy amount is calculated in accordance with the following mathematical expression:

$$F_1^T \dot{x}_0 \quad \text{[Mathematical Expression 14]}$$

The third calculating section 57 outputs a third energy change rate signal specifying the energy change rate of the third energy amount.

The energy change rate calculating section 52 includes a fourth calculating section 58. The fourth calculating section 58 calculates the energy change rate of the fourth energy amount resulting from the torque $\tau_2$ acting on the golf club 14. The fourth calculating section 58 obtains the first torque signals from the component calculating section 44 and the angular velocity signals from the first inertial sensor 12. The energy change rate of the fourth energy amount is calculated in accordance with the following mathematical expression:

$$\tau_2^T \omega_1 \quad \text{[Mathematical Expression 15]}$$

The fourth calculating section 58 outputs a fourth energy change rate signal specifying the energy change rate of the fourth energy amount.

The energy change rate calculating section 52 includes a fifth calculating section 59. The fifth calculating section 59 calculates the energy change rate of the fifth energy amount resulting from the torque $\tau_2$ acting on the golf club 14. The fifth calculating section 59 obtains the first torque signals from the component calculating section 44 and the angular velocity signals from the second inertial sensor 13. The energy change rate of the fifth energy amount is calculated in accordance with the following mathematical expression:

$$\tau_2^T \omega_2 \quad \text{[Mathematical Expression 16]}$$

The fifth calculating section 59 outputs a fifth energy change rate signal specifying the energy change rate of the fifth energy amount.

The arithmetic unit 16 includes an analyzing section 61. The first energy amount signal, the second energy amount signal, the first energy change rate signal, the second energy change rate signal, the third energy change rate signal, the fourth energy change rate signal and the fifth energy change rate signal are input to the analyzing section 61 from the energy change rate calculating section 52. The analyzing section 61 includes a transferring ratio calculating section 62 and an energy change rate inversion detecting section 63.

The transferring ratio calculating section 62 calculates the energy transferring ratio η of the energy transferred to the gold club 14 from the arm 15 of a golfer based on the first energy amount signal and the second energy amount signal. The following mathematical expression is used to calculate the energy transferring ratio η.

$$\eta = \frac{E_{tr}}{E_{in}}$$ [Mathematical Expression 17]

It should be understood that the following mathematical expression is established:

$$E_{tr} = \int \tau_1^T \omega_1 dt$$

$$E_{in} = \int F_2^T \dot{x}_1 dt$$ [Mathematical Expression 18]

The transferring ratio calculating section 62 outputs a transferring ratio signal specifying the energy transferring ratio η.

The energy change rate inversion detecting section 63 determines the timing of the zero crossing of the total energy change rate signal. Here, "zero crossing" means the time point of the total energy change rate signal crossing the "zero" value, or the time point of the inversion from the positive sign to the negative sign of the total energy change rate, or the time point of the balance between the positive value and the negative value of the total energy change rate. The total energy change rate is calculated based on the energy change rate of the first energy amount, the energy change rate of the second energy amount, the energy change rate of the third energy amount and the energy change rate of the fourth energy amount in accordance with the following mathematical expression:

$$\dot{E}_1 = F_1^T \dot{x}_0 - F_2^T \dot{x}_1 + \tau_1^T \omega_1 - \tau_2^T \omega_1$$ [Mathematical Expression 19]

The energy change rate inversion detecting section 63 outputs a zero-crossing signal specifying the change of the total energy change rate along the elapse of time. The time point of the zero crossing is identified based on the change along the elapse of time.

The arithmetic unit 16 includes an image data generating section 64. The image data generating section 64 is connected to the analyzing section 61. The first energy amount signal, the second energy amount signal, the first energy change rate signal, the second energy change rate signal, the third energy change rate signal, the fourth energy change rate signal, the fifth energy change rate signal, the transferring ratio signal and the zero crossing signal are input to the image data generating section 64 from the analyzing section 61. The image data generating section 64 generates a first image data for visualizing the energy change of the first energy along the elapse of time based on the first energy change rate signal. The image data generating section 64 likewise generates a second image data for visualizing the energy change of the second energy along the elapse of time based on the second energy change rate signal. The image data generating section 64 outputs the first image data and the second image date toward the image processing circuit 21.

Figure 4:
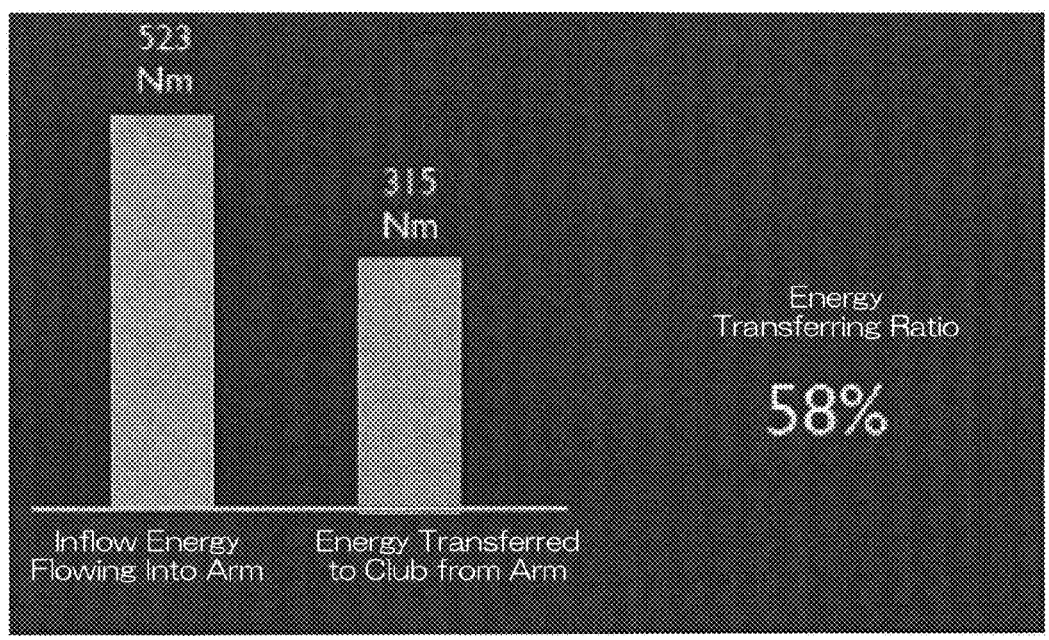
FIG. 4 is an example of a display on the screen illustrating first and second energy amounts and the energy transferring ratio.

The image data generating section 64 may generate a third image data for visualizing the energy transferring ratio η based on the transferring ratio signal. The third image data is output toward the image processing circuit 21. The third image data further includes data for visualizing the first energy amount and the second energy amount. As depicted in FIG. 4, the image processing circuit 21 is capable of operating to display the energy amount and the energy transferring ratio η on the screen of the display unit 22 based on the third image data, for example.

The image data generating section 64 generates a fourth image data for visualizing the total energy change rate along the elapse of time based on the zero crossing signal. The fourth image data is output toward the image processing circuit 21.

(4) Performance of Golf Swing Analyzing Apparatus

A brief description will be made on the performance of the golf swing analyzing apparatus 11. First of all, the golf swing of a golfer is measured. Required information is input to the arithmetic unit 16 through the input device 23 prior to the measurement of a golf swing. Here, one is instructed to input the information including, according to the three-dimensional double pendulum model 31, the mass $m_1$, $m_2$ of the first and second links 32, 33, the inertia tensor $J_1$ of the first link 32 around the fulcrum $x_0$, the inertia tensor $J_2$ of the second link 33 around the joint $x_1$, the length $l_1$ of the first link 32 between the fulcrum $x_0$ and the joint $x_1$, the length $l_{g1}$ between the fulcrum $x_0$ and the centroid $x_{g1}$ of the first link 32, the length $l_{g2}$ between the joint $x_1$ and the centroid $x_{g2}$ of the second link 33, the position $l_{s0}$ of the fulcrum 34 in the local coordinate system $\Sigma_{s1}$, and the position $l_{sj1}$ of the joint 34 in the local coordinate system $\Sigma_{s1}$. The input information is controlled under a predetermined identifier, for example. The identifier may be utilized to discriminate a predetermined golfer.

The first and second inertial sensors 12, 13 are attached to the arm 15 of the golfer and the golf club 14, respectively, prior to the measurement of a golf swing. The left arm may be selected if the golfer is right-handed. The left arm of the right-handed golfer usually keeps straight to the utmost without bending at the elbow. The first and second inertial sensors 12, 13 are fixed to the arm 15 and the golf club 14, respectively, in an immobilized manner.

The first and second inertial sensors 12, 13 start operating to measure prior to the execution of a golf swing. Synchronization is established between the first inertial sensor 12 and the second inertial sensor 13 during the measurement. When the golfer starts a golf swing, the first and second inertial sensors 12, 13 keep operating to continuously measure the acceleration and the angular velocity at predetermined intervals. The size of the intervals determines the resolution of the measurement. The detection signals of the first and second inertial sensors 12, 13 may be transmitted to the arithmetic unit 16 in a realtime fashion, or temporarily be stored in storage devices respectively incorporated in the first and second inertial sensors 12, 13. In the latter case, the detection signals may be transmitted to the arithmetic unit 16 with or without wires after the completion of the golf swing.

The arithmetic unit 16 executes the analysis of the golf swing in response to the receipt of the detection signals. The analysis may be effected between the beginning of the golf swing and the finish of the golf swing, or between the beginning of the golf swing and the impact. The arithmetic unit 16 thus operates to calculate the first energy amount and its energy change rate, the second energy amount and its energy change rate, the third energy amount and its energy change rate, the fourth energy amount and its energy change rate, and fifth energy amount and its energy change rate. The image data generating section 64 operates to generate the first, second, third and fourth image data in response to the calculation of the mentioned energy amounts and the mentioned energy change rates. The first to fourth image data are input to the image processing circuit 21. As a result, expected images are displayed on the screen of the display unit 22.

Figure 5:
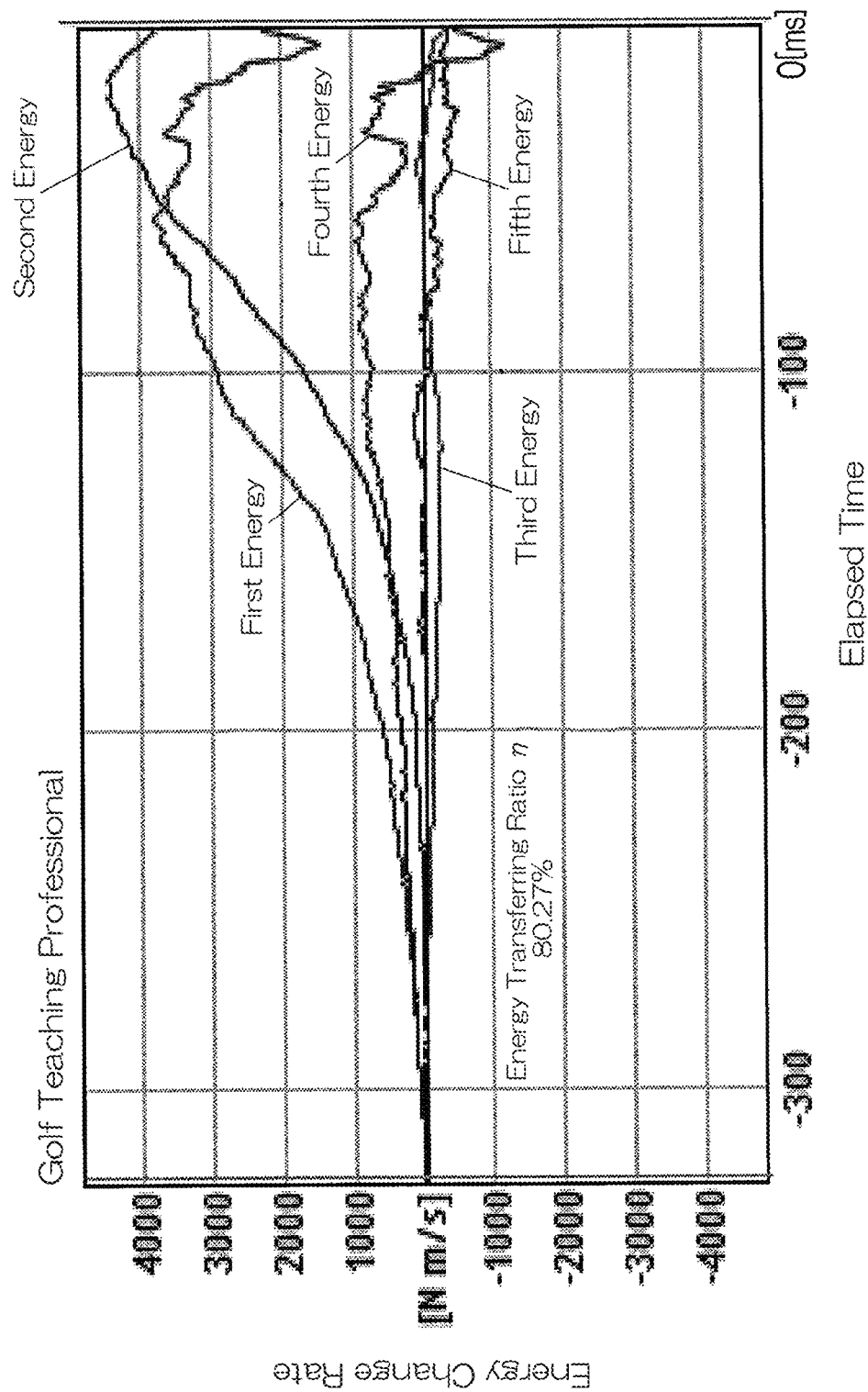
FIG. 5 is a graph illustrating the result of the analysis on a golf swing of a golf teaching professional, specifically a change of the energy change rate along the elapse of time.
Figure 6:
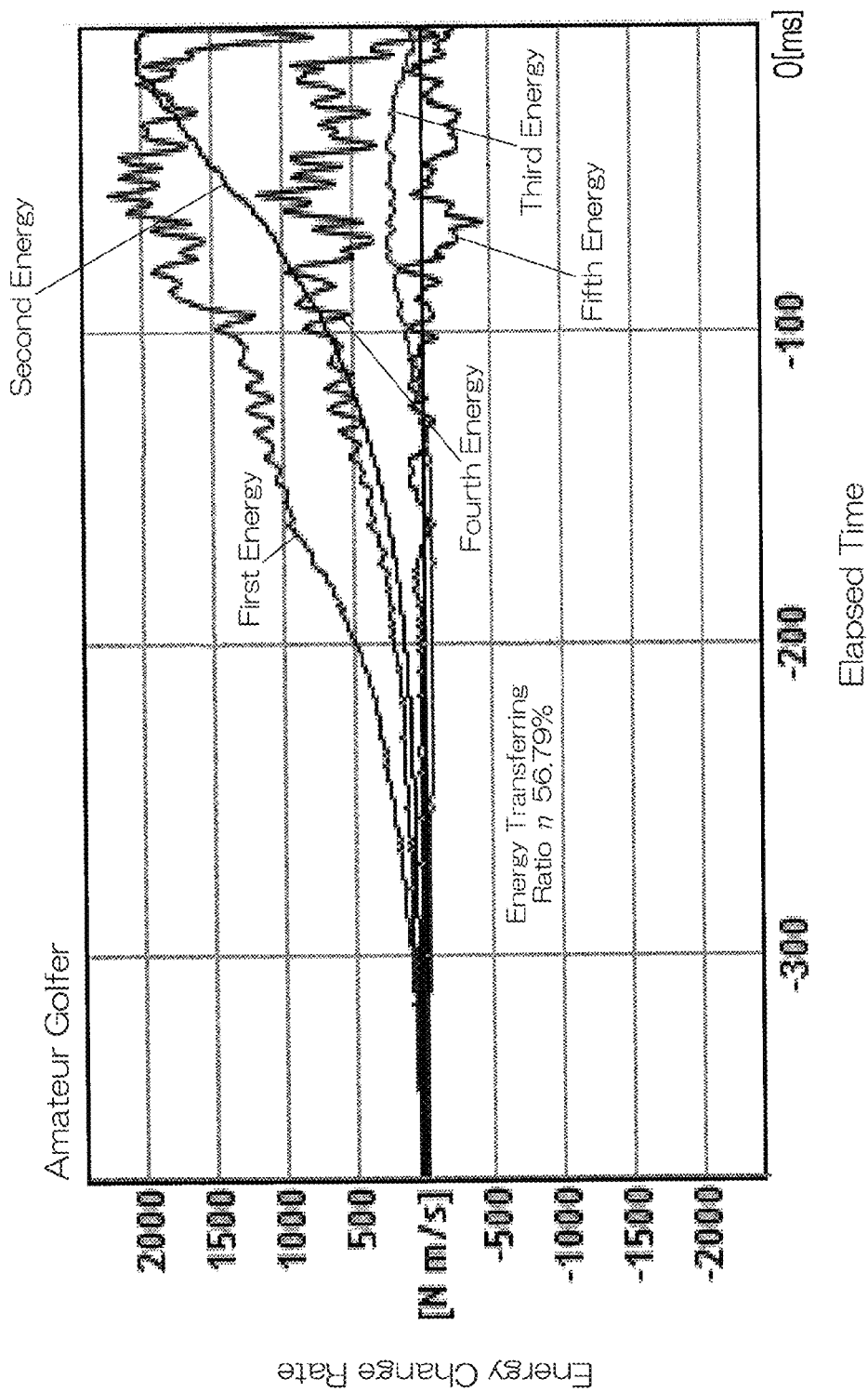
FIG. 6 is a graph illustrating the result of the analysis on a golf swing of an amateur golfer, specifically a change of the energy change rate along the elapse of time.

The inventors have observed the performance of the golf swing analyzing apparatus 11. The golf swing of an amateur golfer and the golf swing of a golf teaching professional are compared with each other in the observation. The energy change rate is plotted along the elapse of time for the first to fifth energy amounts in the comparison. And, the energy transferring ratio η is derived from the plots. As depicted in FIGS. 5 and 6, the inventors have reveals that the golf teaching professional enables not only transfer of a larger energy amount from the arm 15 to the golf club 14 as compared with the amateur golfer but also establishment of a higher energy transferring ratio η as compared with the amateur golfer. The visualization of the energy transferring ratio realizes the establishment of another evaluation parameter, resulting in the feedback of the golf swing analysis of a higher accuracy.

Figure 7:
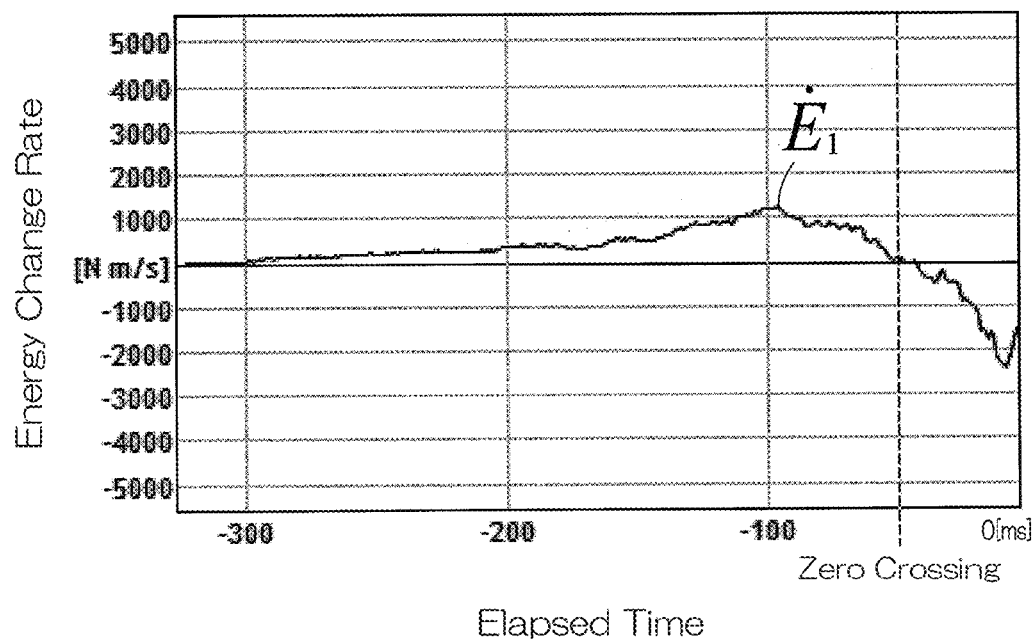
FIG. 7 is a graph illustrating the result of the analysis on a golf swing of a golf teaching professional, specifically a change of the total energy change rate signal along the elapse of time.
Figure 9:
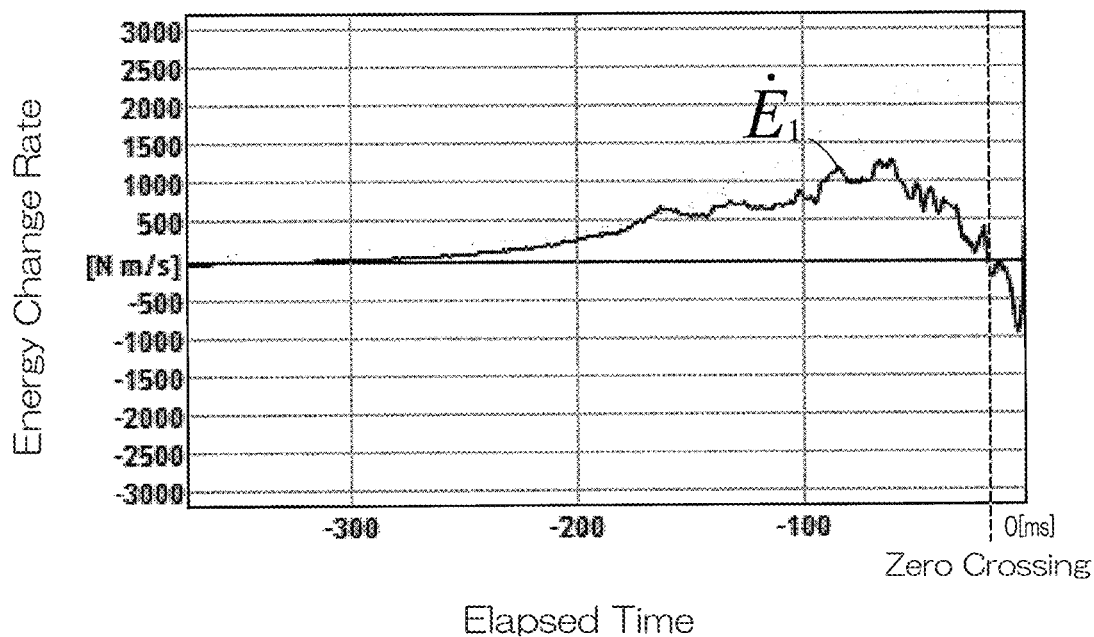
FIG. 9 is a graph illustrating the result of the analysis on a golf swing of an amateur golfer, specifically a change of the total energy change rate signal along the elapse of time.

Next, the inventors have observed the total energy change rate signals of the golf teaching professional and the amateur golfer. FIGS. 7 and 9 illustrate graphs depicting the elapsed time [ms] on the axis of abscissas and the energy change rate on the axis of ordinates. Zero [ms] is set at the moment of the impact of the golf club on the golf ball on the axis of abscissas. For example, −100 [ms] corresponds to 100 [ms] before the impact. FIG. 7 illustrates the result of the golf teaching professional, while FIG. 9 illustrates the result of the amateur golfer.

Figure 8:
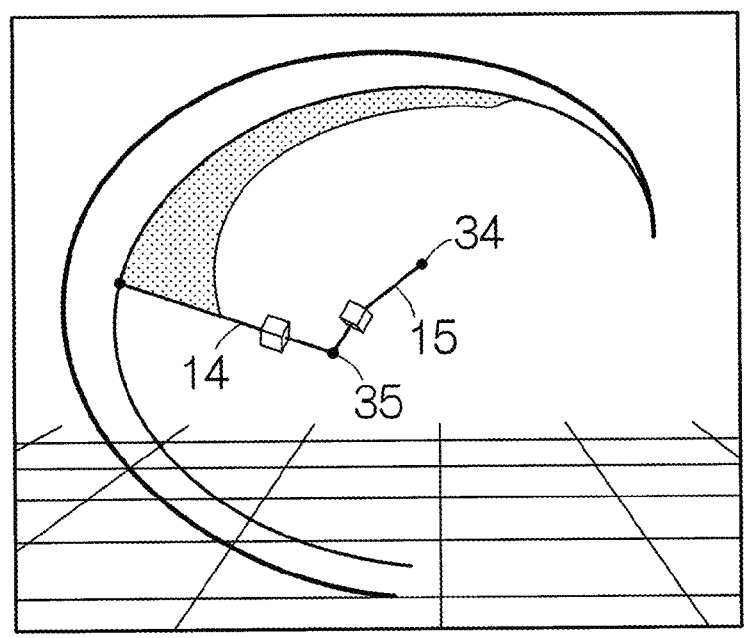
FIG. 8 is a schematic view illustrating the attitude of the golf teaching professional and the golf club at the zero crossing.

As depicted in FIG. 7, the inventors have confirmed the zero point of the total energy change rate for the arm 15, namely the zero crossing in FIG. 7, at a relatively earlier stage of the golf swing of the golf teaching professional. As depicted in FIG. 8, this means that the positive sign of the total energy change rate of the arm 15 changes to the negative sign of the total energy change rate at a position relatively higher in the downswing of the golf club 14. Specifically, it has been confirmed that the pendulum movement of the golf club 14 around the joint 35 starts at a relatively earlier stage in the golf swing of the golf teaching professional.

Figure 10:
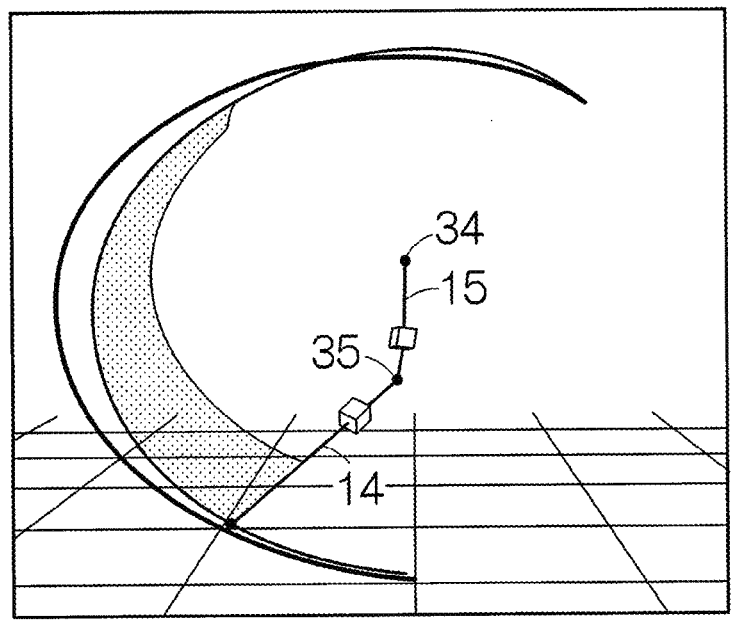
FIG. 10 is a schematic view illustrating the attitude of the amateur golfer and the golf club at the zero crossing.

On the other hand, As depicted in FIG. 9, the inventors have confirmed the zero point of the total energy change rate for the arm 15, namely the zero crossing in FIG. 9, immediately before the impact in the golf swing of the amateur golfer. As depicted in FIG. 10, this means that the positive sign of the total energy change rate of the arm 15 changes to the negative sign of the total energy change rate at a position relatively low in the downswing of the golf club 14. As a result of the comparison, the pendulum movement of the golf club 14 around the joint 35 is expected to contribute to improvement of the energy transferring ratio η. The observation of the zero crossing of the total energy change rate in this manner enables the discovery of the timing of a predetermined action during a golf swing resulting in an efficient transfer of the energy to the golf ball. It is thus possible to provide indices of the timing for the best swing. Repeatedly changing the timing of a predetermined action by the golfer in combination with a subsequent observation of the point of the zero crossing contributes to improvement of the golf swing through try and error. Here, the timing of the action during a golf swing includes rhythm and tempo of a golf swing, as well as the timing of events during a golf swing, such as the time point of relaxing, the time point of reversal of a turn, and the like.

As describe above, the golf swing analyzing apparatus 11 is capable of calculating the inflow energy amount running into the arm 15 of a golfer during the golf swing and the energy amount transferred to the golf club from the arm 15 of the golfer. Accordingly, it is possible to become aware of how much amount of the energy is generated in the arm 15 of the golfer during a golf swing, how much amount of the energy is transferred to the golf club 14 from the arm 15 of the golfer. The observation of such an energy amount enables the discovery of the form of a golf swing resulting in an efficient transfer of the energy to the golf club 14. It is thus possible to provide indices of the form for the golf swing. The repetition of the change of the form and the observation realizes a superior improvement of the form of the golf swing through try and error.

The golf swing analyzing apparatus 11 allows establishment of the three-dimensional double pendulum model 31 including the first link 32 representing to a predetermined portion of the upper body or the arm 15 of the golfer and the second link 33 representing the golf club 14. A golf swing is in this manner fitted into a model. The three-dimensional double pendulum model 31 kinetically represents the movement of the golf swing with a relatively high accuracy. The golf swing is in this manner effectively analyzed. In addition, the fulcrum 34 of the first link 32 is located at the center of a line connecting the shoulders of the golfer. The joint 35 between the first link 32 and the second link 33 is located on the grip of the golf club 14. The golf swing is thus analyzed with a higher accuracy.

It should be noted that it is easily conceivable to a person having ordinary skills in the art to make various modification on the embodiment substantially within the scope of the novel features and effects of the invention although the exemplary embodiment has been described above in detail. The scope of the invention covers all the modifications. For example, the terminology at least once used to mean a broader or similar meaning in the subject specification and attached drawings may have the identical coverage even in the other part of the specification and drawings. In addition, the components and operation of the golf swing analyzing apparatus 11, the first and second inertial sensors 12, 13, the arithmetic unit 16, and the like may not be limited to ones described in the embodiment, and various modification may be made.

What is claimed is:

1. A golf swing analyzing apparatus, comprising:
  a first arithmetic section operating to use an output from a first inertial sensor and an output from a second inertial sensor to calculate a first energy amount, the first inertial sensor being attached to a portion of an upper body of a golfer, the second inertial sensor being attached to a golf club, the first energy amount being generated at the upper body of the golfer;
  a second arithmetic section operating to use the output from the first inertial sensor and the output from the second inertial sensor to calculate a second energy amount transferred to the golf club from the upper body of the golfer;
  a processing section calculating an energy transferring ratio of energy transferred from the upper body of the golfer to the golf club based on a ratio of the second energy amount to the first energy amount; and
  a force calculating section, wherein:
  the first energy amount and the second energy amount are calculated using a three-dimensional double pendulum model that includes a first link that corresponds to the portion of the upper body of the golfer, and a second link that corresponds to the golf club, the force calculating section calculates a first inter-joint force acting on the second link using acceleration signals included in the output from the second inertial sensor and a mass of the golf club, the first arithmetic section includes a first integrating section that calculates the first energy amount by integrating a first energy change rate of the first energy amount using angular velocity signals included in the output from the first inertial sensor, and the second arithmetic section includes a second integrating section that calculates the second energy amount by integrating a second energy change rate of the second energy amount using the first inter-joint force.

2. The golf swing analyzing apparatus according to claim 1, wherein the first link includes a fulcrum that is located at a center of a line connecting shoulders of the golfer, and a joint between the first link and the second link is located on a grip of the golf club.

3. The golf swing analyzing apparatus according to claim 1, wherein the first inertial sensor includes a gyro sensor, and the second inertial sensor includes an acceleration sensor.

4. The golf swing analyzing apparatus according to claim 1, further comprising:

an energy change rate inversion detecting section configured to detect an inversion of positive/negative signs of a total energy change rate for the portion of the upper body of the golfer.

5. The golf swing analyzing apparatus according to claim 1, further comprising:

an image data generating section generating a first image data for displaying the first energy change rate of the first energy amount and a second image data for displaying the second energy change rate of the second energy amount.

6. The golf swing analyzing apparatus according to claim 1, including an image data generating section generating a third image data for displaying the energy transferring ratio.

7. The golf swing analyzing apparatus according to claim 4, further comprising:

an image data generating section generating a fourth image data for displaying a total energy change rate for the portion of the upper body of the golfer.

8. The golf swing analyzing apparatus according to claim 4, further comprising:

an image data generating section that generates image data for relating information on a timing of the inversion to path data of a golf swing generated using an output from at least one of the first inertial sensor and the second inertial sensor.

9. A method of analyzing golf swings, comprising:

calculating a first energy amount generated in an upper body of a golfer based on a three-dimensional double pendulum model, an output from a first inertial sensor, and an output from a second inertial sensor, wherein the first inertial sensor is attached to a portion of the upper body of the golfer, the second inertial sensor is attached to a golf club, the three-dimensional double pendulum model includes a first link that corresponds to the portion of the upper body of the golfer, and a second link that corresponds to the golf club;

calculating a second energy amount transferred to the golf club from the upper body of the golfer, wherein the second energy amount is calculated based on the output from the first inertial sensor and the output from the second inertial sensor;

calculating an energy transferring ratio of an energy transferred from the upper body of the golfer to the golf club based on a ratio of the second energy amount to the first energy amount, calculating a first inter-joint force acting on the second link using acceleration signals included in the output from the second inertial sensor and mass of the golf club, wherein:

the calculating of the first energy amount further comprises integrating a first energy change rate of the first energy amount using angular velocity signals included in the output from the first inertial sensor, and the calculating of the second energy amount further comprises integrating a second energy change rate of the second energy amount using the first inter-joint force.

10. The method of analyzing golf swings according to claim 9, further comprising displaying the energy transferring ratio.

11. The method of analyzing golf swings according to claim 9, further comprising displaying at least one of a total amount of the first energy amount and a total amount of the second energy amount.

* * * * *